Patented Sept. 8, 1936

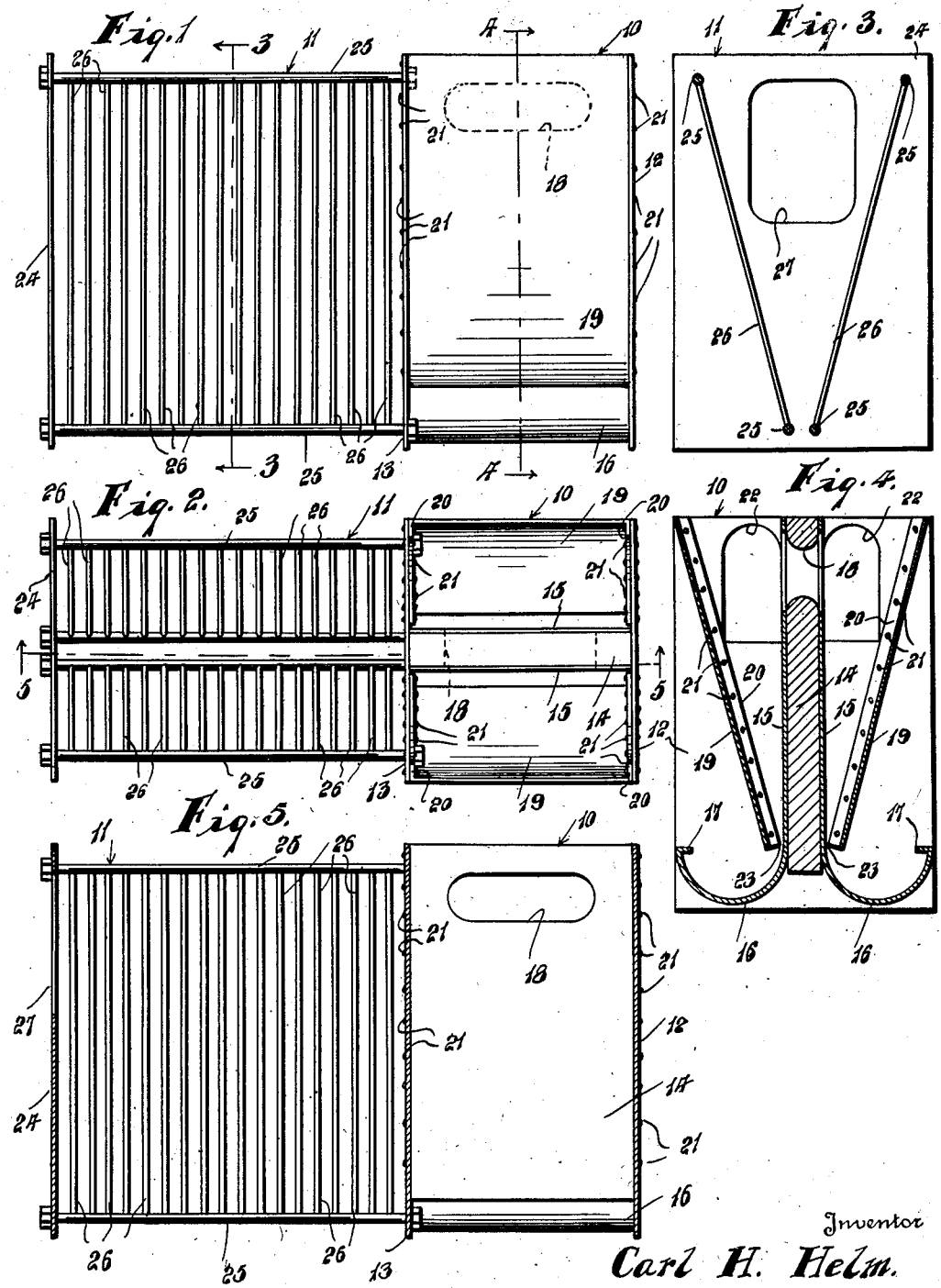

2,053,994

UNITED STATES PATENT OFFICE 2,053,994

RABBIT FEEDER

Carl H. Helm, Polson, Mont.

Application September 27, 1934, Serial No. 745,819

2 Claims. (Cl. 119—51)

The invention relates to feed troughs and racks for animal feeding, and particularly to feeding rabbits in hutches, the principal object of the invention being the provision of a combined device for supplying granular feed and also long feed such as hay, grass, and other long feed, and consisting of a casing having hoppers therein communicating with feed troughs, and a rack to contain the long feed readily accessible by the rabbits, the device being made for ready insertion and removal from rabbit hutches, and provided with means whereby the hoppers and rack may be replenished from time to time without requiring removal from the hutch.

A further object of the invention is the provision of a rabbit feeder that is reasonable in cost of manufacture, and that is preferably made of metal throughout so that it can be readily cleaned when necessary and to prevent gnawing attacks by rats and mice.

The invention will be described in detail hereinafter and will be found illustrated in the accompanying drawing in which Figure 1 is a side view in elevation of an improved rabbit feeder, Figure 2 is a top plan view, Figures 3 and 4 are vertical sectional views on planes indicated by the lines 3—3, and 4—4, respectively, of Figure 1, and Figure 5 is a longitudinal sectional view on a plane indicated by the line 5—5 of Figure 2.

In the drawing similar reference characters are used to designate corresponding parts in all the views.

The rabbit feeder is made up of two portions that are secured together, portion 10 being designed to provide granulated feed for the animals, and portion 11 for supplying long feed such as hay, grass, and other green feed. Portion 10 is essentially a casing having end walls 12 and 13 that are connected together by means of a partition member 14, on opposite sides of which are secured metal plates 15 having their lower ends bent to form troughs 16 and with the extremities of their edges bent inwardly of the troughs as shown at 17. The partition member 14 and plates 15 on opposite sides thereof are provided with an opening 18 that is a handhold for transporting the feeder and installing it and removing it from a rabbit hutch. Also secured to and connecting the end walls 12 and 13 are inclined plates 19 having end flanges 20 that are riveted or otherwise secured to the plates 12 and 13 by means of rivets or other fastening members 21. End wall 12 is also provided with openings 22 giving access to the spaces between the plates 15 and 19 for replenishing the feed in the hoppers formed thereby, it being understood that the feed pours through the restricted openings 23 into the troughs 16 in order to keep a supply of food in said troughs.

Spaced from the end wall 13 is a vertical wall 24, and secured to said vertical wall 24 and end wall 13 are rack members consisting of horizontal bars 25 and spaced rods 26 connecting said horizontal bars, said rack members being inclined downwardly and toward each other to provide a V-shaped feed rack as shown best in Figure 3. End wall 24 is provided with an opening 27 giving access to the V-shaped rack for replenishing the long feed therein.

As has been stated, the feeder because made of metal is readily kept in sanitary condition, as it may be cleaned from time to time, and furthermore cannot be gnawed by rats and other vermin, and as has been also stated may be readily removed and replaced when required, but when in position in a hutch need not be removed for replenishing the feed because of the openings in the vertical walls hereinbefore described that give access to the feed rack and the hoppers supplying the troughs 16.

What I claim as my invention is:—

1. In a portable rabbit feeder, spaced end walls, one of said walls having openings therein, a vertical partition member connecting said end walls, metal plates arranged on opposite sides of said partition, said partition and plates having alined openings therein providing a handhold, the lower edges of said plates bent outwardly of the partition on opposite sides thereof to provide troughs, and other plates secured to said end walls and inclined upwardly and outwardly of the partition, said plates having their lower ends spaced from the troughs and providing with the end walls and the first mentioned plates hoppers delivering into said troughs, the openings in the end wall providing means for supplying material to said hoppers.

2. In a portable rabbit feeder as in claim 1, a vertical plate spaced from one of the first mentioned end walls and having an opening therein and, inclined rack members connecting said vertical plate and the adjacent end wall, each of said rack members comprising horizontal bars secured to the vertical plate and adjacent end wall, and spaced rods connecting the horizontal bars, the opening in the vertical plate providing means for supplying material to the rack members.

CARL H. HELM.